UNITED STATES PATENT OFFICE 2,329,703

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application October 20, 1941, Serial No. 415,766

5 Claims. (Cl. 252—344)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude petroleum and relatively soft waters or weak brines. Controlled emulsification and subsequent demulsification under conditions just mentioned is of significant value in removing impurities, particularly inorganic salts, from pipeline oil.

The demulsifier or demulsifying agent employed in our process, consists of a quaternary compound of the pyridine series of the kind hereinafter described in detail. Members of the pyridine series suitable as reactants include pyridine, alkylated derivatives of pyridine, particularly alkylated derivatives in which the alkyl radical contains three carbon atoms or less, and especially methylated pyridines, i. e., pyridines in which one, two, or three methyl groups have been substituted in the nucleus, such as picolines, lutidines and collidines. Also suitable as reactants are the comparable quinolines and isoquinolines, along with C-methyl homologues thereof. Coal tar bases represent mixtures of suitable heterocyclic materials which may be used as such, or after suitable purification, without separation into the individual components.

Specifically, then, the compounds herein contemplated as demulsifiers consist of the quaternary nitrogen products obtained by reacting one mole of hydroxy compounds (substituted lactamides containing at least one nitrogen-linked high molal hydrocarbon radical having at least 8 and not more than 32 carbon atoms), of the following formula:

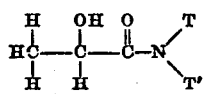

wherein, T is a hydrocarbon radical having at least 8 and not more than 32 carbon atoms, and T" is a hydrogen atom, a hydrocarbon radical having less than 8 carbon atoms, or the same as T, with a heterocyclic compound of the pyridine series selected from the group consisting of pyridine, quinoline, isoquinoline, and C-methyl homologues thereof, in the presence of substantially one mole of halogen hydride at an elevated temperature, the heterocyclic compound being applied in an amount substantially equivalent to the halogen hydride, and usually in excess thereof, i. e., the reaction being conducted in the presence of the free base.

As to primary or secondary amines having at least 8 and not more than 32 carbon atoms, and which are suitable for reaction with lactic acid or its functional equivalent, for instance, ethyl lactate, reference is made to U. S. Patent No. 2,246,842, dated June 24, 1941, to De Groote. It is to be noted that that particular patent excludes arylamines; but it is understood that such compounds are not excluded in the present instance. For instance, naphthylamine, methyl naphthylamine, ethyl naphthylamine, and the like, may be employed.

Furthermore, attention is directed to the fact that said aforementioned De Groote patent contemplates, inter alia, certain tertiary amines. Such amines, of course, are not herein contemplated as reactants, insofar that there is no reactive hydrogen atom available.

The primary amines which may be used as such or converted into secondary amines by conventional processes, such as treatment with methyl iodide, benzyl chloride, alkyl sulphates, or the like, include the following: octadecenylamine; cetylamine; stearylamine; oleoamine; ricinoleoamine; amines derived from naphthenic acids; amines derived from octadecadiene 9, 11-acid-1; octadecylamide; amines derived from mixed unsaturated fatty acids, such as soyabean fatty acids; cottonseed oil fatty acids; linseed oil fatty acids; heptadecylamine, hexadecylamine; dodecylamine; decylamine, etc. The amines may be aliphatic, aralkyl, alicyclic, aryl, alkyl, etc.

One may also employ amines derived from acids obtained by oxidation of wax, paraffin, etc. Such acids may have as many as 32 carbon atoms. For instance, see U. S. Patent No. 2,242,837, dated May 20, 1941, to Shields. The following patents listed in the aforementioned De Groote Patent No. 2,246,842, are herein included as a matter of convenience indicating means of obtaining such high molal primary or secondary amines or methods which can be obviously modified to produce the same:

| | Dated | Patentee |
|---|---|---|
| U. S. Patent Nos.: | | |
| 1,951,469 | March 20, 1934 | Bertsch |
| 2,006,058 | June 25, 1935 | Olin |
| 2,033,866 | March 10, 1936 | Schrauth |
| 2,074,380 | March 23, 1937 | Flett |
| 2,078,922 | May 4, 1937 | Arnold |
| 2,091,105 | August 24, 1937 | Pigott |
| 2,108,147 | February 15, 1938 | Speer |
| 2,110,199 | March 8, 1938 | Carothers |
| 2,132,902 | October 11, 1938 | Lenher |
| 2,178,522 | October 31, 1938 | Ralston |
| British Patent Nos.: | | |
| 359,001 | Of 1932 | Johnson |
| 358,114 | Of 1932 | Carpmael |

Having obtained a high molar amine of the kind described, it is reacted with lactic acid or its functional equivalent, and most preferably, with a lactic acid ester, for instance, methyl lactate, ethyl lactate, propyl lactate, etc. Such reaction results in the formation of a substituted lactamide, as indicated by the following:

$$\begin{array}{c} H \quad OH \quad O \\ HC-C-C-OC_2H_5 + HNT \\ H \quad H \quad \quad \quad \quad H \end{array}$$

$$\begin{array}{c} H \quad OH \quad O \\ HC-C-C-OCH_3 + HNT \\ H \quad H \quad \quad \quad \quad H \end{array}$$

The substituted lactamides thus obtained are reacted with pyridine hydrochloride or a halide of any of the heterocyclic bases previously described, or mixtures thereof. Such reactions may be indicated in the following manner:

$$\begin{array}{c} Cl \quad \quad \quad H \quad O \quad T \\ \langle N \rangle H + OH \cdot C-C-N \\ \quad \quad \quad \quad HCH \quad T' \\ \quad \quad \quad \quad H \end{array}$$

Our preferred reactants are; octadecyllactamide; cetyllactamide; stearyllactamide; hydroxydecyllactamide; octadecyllactamide; dodecyllactamide; octyllactamide; decyllactamide; heptadecyllactamide; or the comparable derivatives obtained from ricinoleic acid, oleic acid, or mixed fatty acids of the kind previously described. In some instances, of course, the hydrocarbon group actually has an oxygen atom present, as, for example, when derived from an amine, which, in turn, is obtained from ricinoleic acid as a raw material. This matter has also been referred to in the aforementioned De Groote Patent No. 2,246,842.

In any event, having obtained a suitable substituted lactamide of the kind described, it is reacted with pyridine hydrochloride or the equivalent. The mechanical procedure employed is substantially the same as used in connection with another type of reaction involving the formation of quarternary compounds by the elimination of water. See U. S. Patent No. 2,242,211, dated May 20, 1941, to Haack. See also our co-pending application for Patent Serial No. 401,375, filed June 7, 1941, which subsequently matured as U. S. Patent No. 2,273,181, dated January 17, 1942, to De Groote and Keiser.

The compounds or compositions of matter intended to be used as the demulsifier of our process may be exemplified by the following examples:

*Example 1*

One pound mole of octyllactamide (derived by reaction between octylamine and ethyl lactate) is reacted with 1.1 pound moles of pyridine hydrochloride in the presence of 1/20th of a mole of free pyridine. The reaction is conducted at approximately 150–160° C, until the substituted lactamide has been converted into the quarternary compound. This reaction is complete in a comparatively short time, in some instances less than one hour, although in other instances three or four hours may be required. If desired, the reaction may be conducted at a slightly higher temperature, for instance, as high as 180° C. Instead of using pyridine hydrochloride, one may employ the hydrochloride of a fraction of pyridine bases of the kind that 50% will distill over at 140° C. or below, and 90%, at 160° C. or below. Such selected pyridine bases are of the kind which are entirely water-soluble.

*Example 2*

Octadecenyllactamide is substituted for octyllactamide in Example 1, preceding.

*Example 3*

Octadecyllactamide is substituted for octyllactamide in Example 1, preceding.

*Example 4*

Dodecyllactamide is substituted for octyllactamide in Example 1, preceding.

*Example 5*

Decyllactamide is substituted for octyllactamide in Example 1, preceding.

*Example 6*

The substituted lactamide derived by reaction between metyl lactate and ricinoleoamine is substituted for octyllactamide in Example 1, preceding.

*Example 7*

Naphthenic acids of the following characteristics:

| | | |
|---|---|---|
| Unsaponifiable matter | per cent | 6.8 |
| Water by distillation | do | 1.0 |
| Saponification Number | do | 229.0 |
| Neutralization Number | do | 223.0 to 228.0 |
| Ash | do | 0.76 | are converted into amines in the conventional manner, and such naphthenylamine is reacted with ethyl lactate to obtain the corresponding substituted lactamide, instead of octyllactamide, in Example 1, preceding.

The manufacture of the above compounds is usually conducted with an excess of the pyridinium base halide, such as the hydrochloride, or hydrobromide, and usually, in the presence of a significant amount of the free pyridinium base itself. In many instances, however, there is no need to use an excess of the pyridinium base halide, and, in fact, no need to have present any of the free pyridinium base itself, or, at the most, only a trace of the free base.

Sometimes the reaction with the pyridinium compound can be catalyzed by the presence of small amounts of soaps or alkalies. As is obvious, other monovalent anions may replace the halogen and serve as a functional equivalent.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process, for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to the emergence of said well fluids. This particular type of application is decidedly feasible when the demulsifier is used in connection with acidification of calcareous oil-bearing strata, especially if suspended in or dissolved in the acid employed for acidification.

Attention is directed to our co-pending application for patent, Serial No. 401,375, filed July 7, 1941, which subsequently matured as U. S. Patent No. 2,273,181, dated February 17, 1942, to De Groote and Keiser. Said copending application contemplates resolution of petroleum emulsions of the water-in-oil type by means of demulsifiers of the following formula type:

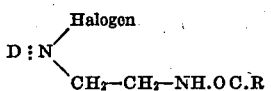

in which the acyl radical RCO is derived from a monocarboxy detergent-forming acid having at least 8 carbon atoms and not more than 32 carbon atoms; and D:N represents a heterocyclic compound of the pyridine series consisting of pyridine, quinoline, isoquinoline, and C-methyl homologues thereof. The halogen, of course, is most suitably chlorine or bromine; but iodine may be employed except for its excessive cost. More correctly, D:N is contemplated as a radical, rather than a compound.

Attention is also directed to our co-pending applications, filed the same date as the instant application, and bearing the following serial numbers: 415,763, 415,764 and 415,765.

Having thus described our invention, what we claim as new and desire to secure by Letters Patent is:

1. A process for breaking petroleum emulsions of the water-in-oil type, which consists in subjecting the emulsion to the action of a demulsifier comprising a chemical compound of the following formula type:

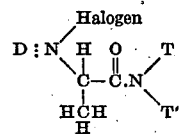

wherein T is a hydrocarbon radical having at least 8 and not more than 32 carbon atoms, and T" is a member of the class consisting of hydrogen atoms, hydrocarbon radicals having less than 8 carbon atoms, and hydrocarbon radicals having at least 8 and not more than 32 carbon atoms; and D:N represents a radical of a heterocyclic compound of the pyridine series consisting of pyridine, quinoline, isoquinoline, and C-linked methyl homologues thereof.

2. A process for breaking petroleum emulsions of the water-in-oil type, which consists in subjecting the emulsion to the action of a demulsifier comprising a chemical compound of the following formula type:

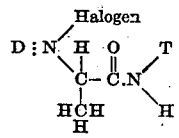

wherein T is a hydrocarbon radical having at least 8 and not more than 32 carbon atoms; and D:N represents a heterocyclic compound of the pyridine series consisting of pyridine, quinoline, isoquinoline, and C-linked methyl homologues thereof.

3. A process for breaking petroleum emulsions of the water-in-oil type, which consists in subjecting the emulsion to the action of a demulsifier comprising a chemical compound of the following formula type:

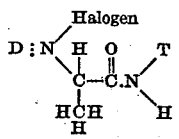

wherein T is an alkyl radical having at least 8 and not more than 32 carbon atoms; and D:N represents a radical of a heterocyclic compound of the pyridine series consisting of pyridine, quinoline, isoquinoline, and C-linked methyl homologues thereof.

4. A process for breaking petroleum emulsions of the water-in-oil type, which consists in subjecting the emulsion to the action of a demulsifier comprising a chemical compound of the following formula type:

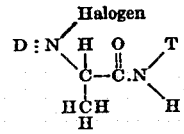

wherein T is an alicyclic radical having at least 8 and not more than 32 carbon atoms; and D:N represents a radical of a heterocyclic compound of the pyridine series consisting of pyridine, quinoline, isoquinoline, and C-linked methyl homologues thereof.

5. A process for breaking petroleum emulsions of the water-in-oil type, which consists in subjecting the emulsion to the action of a demulsifier comprising a chemical compound of the following formula type:

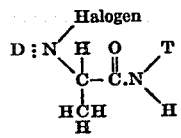

wherein T is an aryl radical having at least 8 and not more than 32 carbon atoms; and D:N represents a radical of heterocyclic compound of the pyridine series consisting of pyridine, quinoline, isoquinoline, and C-linked methyl homologues thereof.

MELVIN DE GROOTE.
BERNHARD KEISER.